United States Patent [19]

Citta

[11] 4,190,862
[45] Feb. 26, 1980

[54] VIDEO CARRIER RECOGNITION SYSTEM

[75] Inventor: Richard W. Citta, Oak park, Ill.

[73] Assignee: Zenith Radio Corporation, Glenview, Ill.

[21] Appl. No.: 875,645

[22] Filed: Feb. 6, 1978

[51] Int. Cl.² ............................................. H04N 5/50
[52] U.S. Cl. .................................. 358/195; 455/192
[58] Field of Search ........................... 358/21, 23, 195

[56] References Cited
U.S. PATENT DOCUMENTS

| | | | |
|---|---|---|---|
| 3,632,864 | 1/1972 | Evans | 358/195 X |
| 3,737,565 | 6/1973 | Ma et al. | 358/193 |
| 3,825,838 | 7/1974 | Mayle | 358/195 X |
| 3,949,158 | 4/1976 | Rzeszewski et al. | 358/195 |
| 4,038,689 | 7/1977 | Rzeszewski et al. | 358/195 X |

Primary Examiner—Benedict V. Safourek
Assistant Examiner—Aristotelis M. Psitos

[57] ABSTRACT

A video carrier recognition system for use with a signal seeking television receiver tuner or the like includes a plurality of detectors for recognizing certain conditions indicating that the receiver is appropriately tuned to a video carrier signal. The conditions comprise AFC system lock, the presence of a relatively low peak duty cycle characterizing the low-pass filtered output of the receiver's video detector and the absence of a relatively large amplitude 1.5 MHz beat note at the output of the video detector. In addition, noise immunity may be provided by requiring correlation between the low-pass filtered output of the video detector and the horizontal flyback pulses developed in the horizontal deflection system of the receiver.

9 Claims, 8 Drawing Figures

VIDEO CARRIER RECOGNITION SYSTEM

BACKGROUND OF THE INVENTION

The present invention relates in general to television receivers and more particularly to a novel circuit arrangement for recognizing a properly tuned video intermediate-frequency (IF) subcarrier signal.

So-called television signal identification or recognition systems find use in a variety of applications in television receiver tuning systems. In particular, signal seeking tuning systems and wide band automatic frequency control (AFC) systems frequently utilize such signal recognition systems. In signal seeking tuning systems, for example, the television tuner is typically caused to scan the RF television frequency spectrum until a received signal is recognized as comprising a valid television signal whereupon a control signal is developed inhibiting further scanning. An exemplary system of the foregoing type is disclosed in U.S. Pat. No. 3,737,565 to Ma et al. Wide band AFC systems, on the other hand, sometimes utilize signal recognition arrangements to facilitate intra-channel tuning in association with a conventional narrowband AFC circuit. U.S. Pat. No. 3,949,158 to Rzeszewski et al typifies a wide band AFC system of the latter type. In either case, the primary function of the signal recognition system is to interrogate a television channel, or part of a television channel, to identify the condition wherein a received television signal has been properly tuned by the receiver. Proper tuning in this sense, of course, contemplates the production of a video IF subcarrier signal at the video IF frequency of the receiver.

Conventionally, television signal recognition systems employ a tuned circuit, resonant at the video IF subcarrier frequency, for developing a recognition signal in response to resonance of the tuned circuit. In such systems, it is generally assumed that if a signal is detected by the resonant circuit, the detected signal is a video subcarrier and that therefore the receiver is receiving and is properly tuned to a broadcast television signal. However, under various circumstances, it is possible for the tuner to be mistuned or for the broadcast television signal to be offset from its assigned frequency so that, for example, the lower adjacent channel audio subcarrier beats with the tuner local oscillator to produce a signal having a frequency corresponding to the video IF frequency of the receiver. Under these conditions, the tuned circuit is caused to resonate in response to the adjacent channel audio subcarrier and to consequently develop a recognition signal even though the receiver is actually mistuned. To overcome this problem, prior art recognition systems generally employ additional circuitry to more reliably associate only a received picture carrier with the video IF frequency.

For instance, in U.S. Pat. No. 3,737,565 to Ma et al, a recognition system is disclosed employing tuned circuits resonant at the video and audio IF frequencies as well as circuitry for detecting the presence of horizontal synchronizing signals. Outputs from the tuned circuits and from the sync detector are coupled to a coincidence gate for producing a recognition signal. Systems utilizing circuits tuned to the video and audio IF subcarriers but detecting vertical sync in lieu of horizontal sync are disclosed in U.S. Pat. Nos. 3,949,158 and 4,041,535 both issued to Rzeszewski et al. A somewhat different approach is taught in U.S. Pat. No. 3,916,093 to Parker wherein signal recognition is effected in response to the comparative frequencies of the received video and audio IF signals. Finally, to provide a system independent of video signal strength, U.S. Pat. No. 3,825,838 to Mayle teaches the use of a tuned circuit resonant at the video IF frequency only during the concurrence of a horizontal synchronizing pulse and a horizontal flyback pulse.

It will be observed that most of the prior art systems discussed above rely on the utilization of means to detect the presence of a signal carrier at the IF audio frequency in addition to the detection of a carrier signal at the video IF frequency. As mentioned previously, this is done to more reliably develop a recognition signal only in response to a video subcarrier having a frequency corresponding to the video IF frequency. A problem encountered in several situations, however, is that the television signal supplied to the tuner simply contains no audio information thereby rendering such systems largely ineffective. For example, audio information is not infrequently deleted from television signals coupled to the receiver from master antenna television systems and video games. Moreover, for the situation where the tuner is mistuned so that the adjacent channel audio subcarrier is locked at the video IF frequency, third harmonics of the adjacent audio subcarrier may be produced and these harmonics will occur at a frequency normally expected to be occupied by the channel's associated audio carrier. As a result, the IF frequency spectrum is characterized by the adjacent channel audio subcarrier at the video IF frequency and its third harmonics at the audio IF frequency. Now, since subcarrier signals are present at both the video and audio IF frequencies, the prior art recognition system may be "fooled" into developing a recognition signal even though the channel is not properly tuned.

In addition, monitoring the additional parameter of horizontal or vertical sync does not entirely avoid the foregoing problems. More specifically, cross and intermodulation effects frequently cause the erroneously tuned adjacent channel audio carrier to exhibit sync signal components which are generally not discernable by prior art recognition systems from the sync signals present in the video signals. Consequently, a recognition signal may again be developed even though the receiver is not properly tuned to a television channel.

SUMMARY OF THE INVENTION

In view of the foregoing it is a basic object of the present invention to provide a novel and improved signal recognition system for use with a television receiver.

It is a further object of the invention to provide such a novel and improved signal recognition system which reliably recognizes proper tuning of a television signal by accurately identifying the condition wherein a video subcarrier signal is tuned to the video IF frequency of a television receiver.

In accordance with these and other useful objects a signal recognition system constructed according to the invention is operative in the environment of a conventional television receiver having a tuner for developing video and audio IF sub-carrier signals from a received RF television signal, an AFC system for locking one of the subcarrier signals to the receiver's video IF frequency and a video detector for demodulating the video IF subcarrier signal. In this environment, the signal recognition system comprises a first detector coupled to the AFC system for detecting the condition wherein an IF subcarrier signal has been locked to the receiver's video IF frequency. A second detector detects the duty cycle of the peaks of a low-pass filtered output of the video detector, which peaks correspond to the horizontal synchronizing pulses of a properly tuned broadcast television signal. The detection of AFC lock-on in combination with the peaks of the low-pass filtered output of the video detector being characterized by a duty cycle having a value less than a predetermined value is normally indicative of the condition that a video IF subcarrier is appropriately locked to the receiver's video IF frequency. To improve the system's ability to properly process a noisy signal a correlator is provided to detect correlation between the previously mentioned low-pass filtered spikes and the horizontal flyback pulses developed in the receiver's horizontal deflection system. In addition, the case of an envelope-type video detector, a final detector is provided for sensing the presence of a relatively high amplitude 1.5MHz beat note in the output of the video detector. Although causing the duty cycle detector to develop an output representing that the tuner is properly tuned, the presence of this beat note is actually indicative of the condition that the AFC system has locked the adjacent channel's audio subcarrier to the receiver's video IF frequency. Finally, a coincidence gate is provided to process the outputs of the detectors and the correlator for developing a recognition signal in response to a video sub-carrier being locked to the receiver's video IF frequency.

DESCRIPTION OF THE PREFERRED EMBODIMENT

Figure 1:
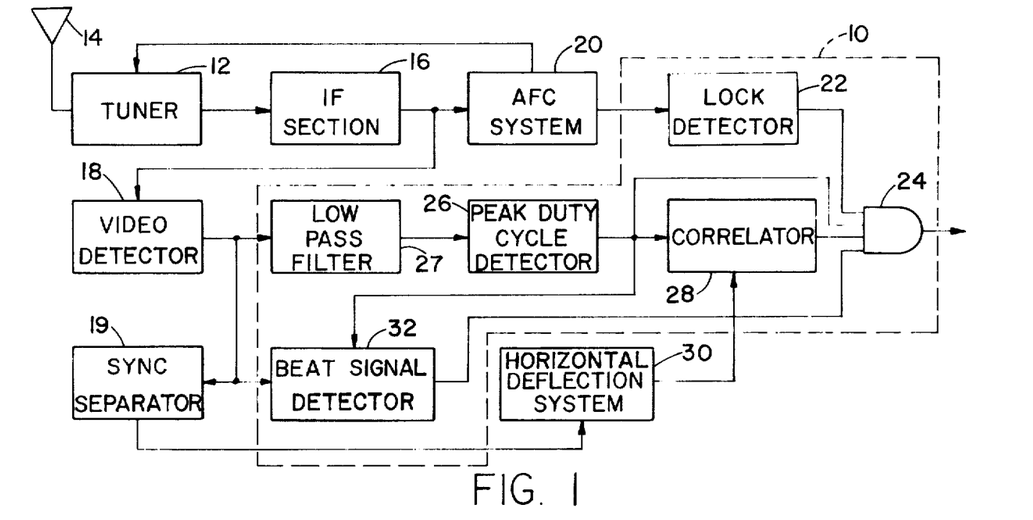
FIG. 1 is a generalized block diagram illustrating the video carrier recognition system of the present invention and its interface with a conventional television receiver.

Referring now to the drawings, FIG. 1 illustrates in generalized block diagram form the preferred embodiment of the picture carrier recognition system of the present invention. The picture carrier recognition system, identified generally by reference numeral 10, is operative in the environment of a monochrome or color television receiver whose design may be entirely conventional. Accordingly, only those portions of the receiver directly pertinent to the operation of the picture carrier detection system 10 are illustrated in the figure. In its most general aspect, picture carrier recognition system 10 is responsive to certain signals normally developed in the television receiver for providing an output control signal indicative of the condition that the television receiver has appropriately tuned or locked onto a picture carrier.

With further reference to FIG. 1, a tuner 12 is responsive to the inducement of an RF television signal on an antenna 14 for developing a video intermediate-frequency (IF) signal, an audio IF signal and a chroma IF signal. The IF signals developed by tuner 12 are coupled to an IF section 16 for suitable processing and therefrom to a video detector 18. Video detector 18 is responsive to the video IF signal developed at the output of IF section 16 for developing the video and sync signals in response to which the receiver produces a displayed image. The horizontal sync signals developed at the output of video detector 18 are coupled to the receiver's horizontal deflection system 30 through a sync separator circuit 19 while the video information is supplied to the luminance and chrominance sections of the receiver. The IF signals developed at the output of IF section 16 are also coupled to an automatic frequency control (AFC) system 20. AFC system 20 may be of conventional design and will typically include a discriminator or the like having a frequency characteristic adapted for causing tuner 12 to appropriately convert the RF television signal for suitable processing by IF section 16. More specifically, IF section 16 exhibits a frequency response deliberately designed to amplify, in suitable proportions, an IF video carrier having a frequency of 45.75MHz, a chroma carrier having a frequency of 42.17MHz and the associated sound carrier at a frequency of 41.25MHz. Should any of these carrier signals deviate from the preset frequencies, IF section 16 will not properly amplify the signals thereby distorting the reproduced audio and/or picture information. AFC system 20 is therefore provided for automatically correcting any such distortion producing frequency deviations by coupling an error signal proportional to the frequency deviation to tuner 12. The tuner responds to the error signal by adjusting the intermediate frequency signals to their nominal values. The operation of AFC system 20 in driving tuner 12 for developing output video frequencies at 45.75MHz is frequently referred to as locking onto the IF subcarrier signal.

In accordance with the present invention, picture carrier recognition system 10 comprises a lock detector 22 coupled between the output of AFC system 20 and one input of a multiple input AND gate 24. A second input of AND gate 24 is supplied from the output of a peak duty cycle detector 26 which is responsive to the horizontal synchronizing pulses developed at the output of video detector 18 and coupled thereto through a low-pass filter 27. The output of peak duty cycle detector 26 also supplies a correlator 28 which also receives an input constituting the horizontal flyback pulses developed at the output of horizontal deflection system 30. The output of correlator 28 is, in turn, connected to a third input of AND gate 24. Finally, a beat signal detector 32, gated by the output of peak duty cycle detector 26, is responsive to the output of video detector 18 for supplying the final input of AND gate 24.

Figure 2:
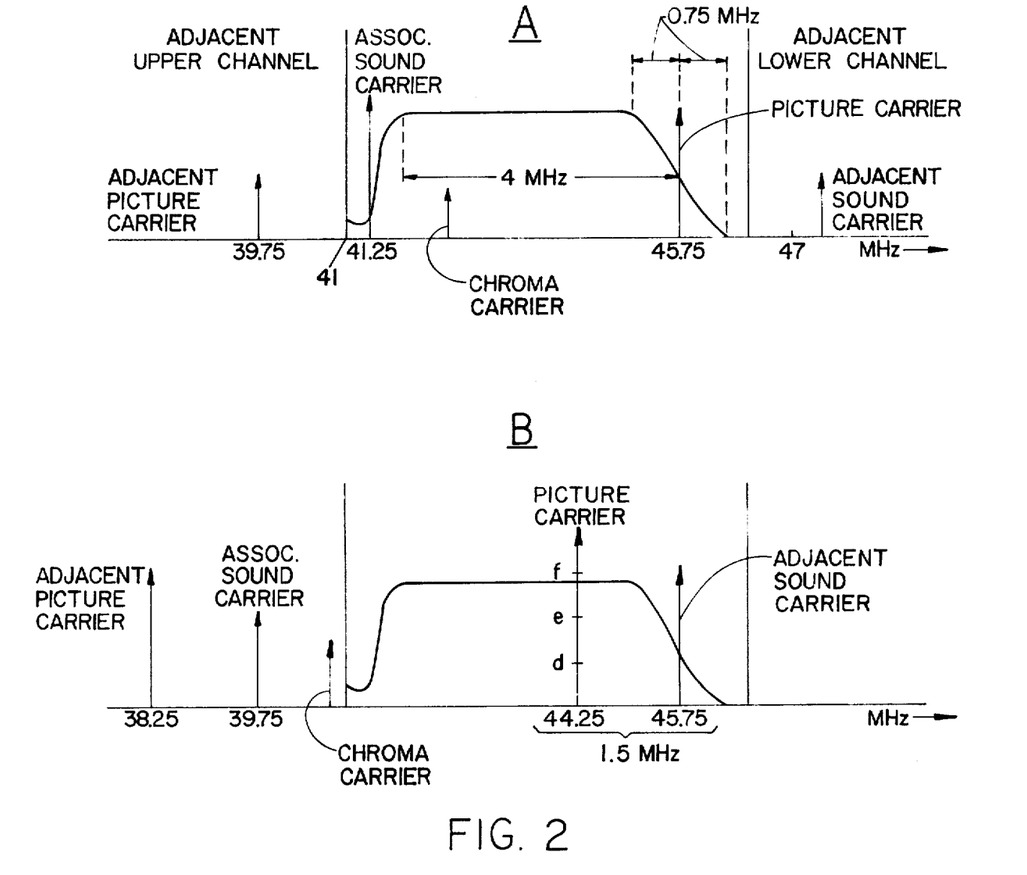
FIG. 2 graphically depicts the frequency response of the IF section of a conventional television receiver under two tuning conditions.

Before proceeding with a discussion of the system illustrated in FIG. 1, it will be convenient to initially examine the waveforms illustrated in FIGS. 2A and 2B which depict the frequency response of a typical television receiver IF section wherein correction is provided for the vestigial-side-band transmitted RF picture carrier. Referring specifically to FIG. 2A, it will be observed that a given television channel occupies a bandwidth of approximately 6MHz extending between the IF frequencies of 41 and 47MHz. Under proper operating conditions, the picture IF carrier is locked by AFC system 20 at a frequency of 45.75MHz and the audio IF carrier is spaced therefrom by 4.5MHz at 41.25MHz while the chroma carrier is characterized by a frequency of about 42.17MHz. Furthermore, the adjacent lower channel sound carrier is spaced from the picture carrier by 1.5MHz at a frequency of 47.25MHz while the adjacent upper channel picture carrier has a frequency of 39.75MHz. Thus, under the conditions illustrated in FIG. 2A, the channel's IF audio and video signals are suitably amplified by IF section 16 while the adjacent sound and picture carriers are attenuated to reduce interference problems.

For various reasons, AFC system 20 may erroneously lock onto a signal carrier other than the desired picture carrier due to the system's inability to distinguish between the various carrier signals. In particular, it is not uncommon for the AFC system to lock onto the adjacent lower channel sound carrier which is only separated by 1.5MHz from the desired picture carrier. This condition is illustrated in FIG. 2B. It will be observed that the effect of locking onto the adjacent lower channel sound carrier is to shift all carrier signal frequencies by 1.5MHz in a negative direction relative to the IF section frequency response. As a result, the adjacent sound carrier is amplified by the IF section while the higher frequency components of the video carrier are attenuated. In addition, the associated sound carrier at a frequency of 39.75MHz is outside the IF section's passband and is therefore substantially entirely attenuated. To further complicate the matter, the 45.75MHz adjacent sound carrier, which is now being amplified by IF section 16, heterodynes with the 44.25MHz picture carrier in video detector 18 to produce a 1.5MHz beat note modulated by the detected video signal. And, as the amplitude of the picture carrier increases relative to the adjacent sound carrier, heavy cross-modulation results increasing and further distorting the detected video signal. While the foregoing effects of erroneously locking onto an adjacent sound carrier are normally considered undesirable, particularly those resulting from cross-modulation between the carrier signals, they are used to advantage in the present invention for enabling recognition of the condition wherein the AFC system is locked to a picture carrier.

Referring back to FIG. 1, depending upon the particular apparatus constituting video detector 18, either 3 or 4 conditions must be satisfied for recognition system 10 to develop an output control signal at the output of AND gate 24 representing the recognition of a picture carrier. Considering the case of a synchronous video detector, lock detector 22 must generate an output indicating that AFC system 20 has locked onto a carrier signal, peak duty cycle detector 26 must generate an output indicating the presence of negative or positive going low-pass filtered horizontal sync signals and correlator 28 must generate an output indicative of the existence of correlation between these low-pass filtered horizontal sync signals and the horizontal flyback pulses. For the case of an envelope video detector, in addition to satisfying the foregoing conditions, beat signal detector 32 must develop an output representing the absence of a high amplitude 1.5MHz beat signal at the output of video detector 18. The satisfaction of the three step test for a synchronous video detector or the four step test for an envelope detector will result in AND gate 24 developing an output representing that AFC system 20 has appropriately locked tuner 12 onto a picture carrier.

Figure 3:
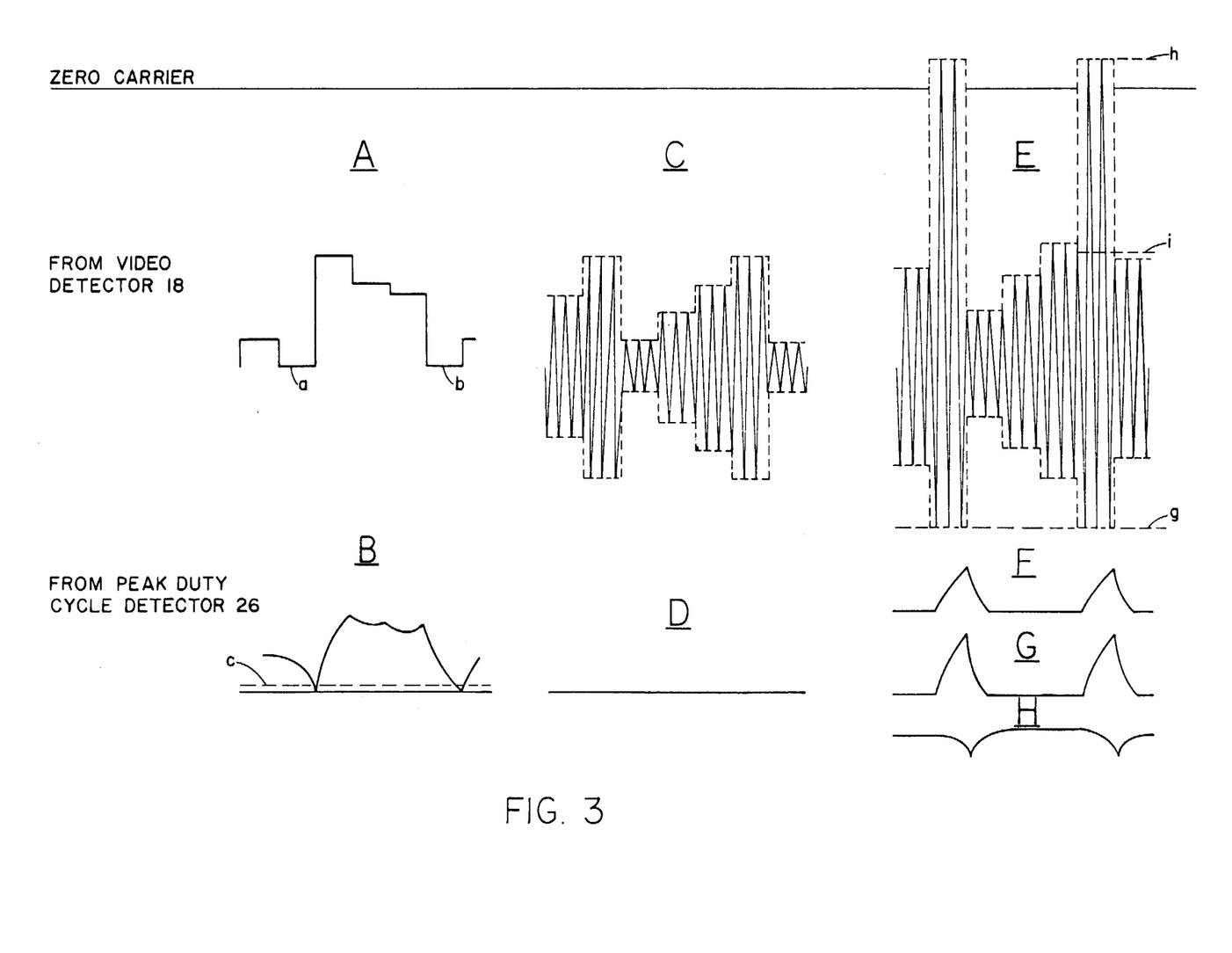
FIG. 3 shows various waveforms illustrating the operation of the video carrier recognition system of the present invention.

A more detailed explanation of the operation of the picture carrier recognition system shown in FIG. 1 will now be undertaken with the aid of the waveforms illustrated in FIG. 3. Initially, lock detector 22 is responsive to AFC system 20 for coupling a logically high level signal to the first input of AND gate 24 whenever a carrier signal has been locked at 45.75MHz. As explained previously, the locked carrier signal could be either a picture carrier, a sound carrier or a chroma carrier. Next, the output of video detector 18 is coupled to low-pass filter 27 which operates basically as an integrator and therefrom to circuit 26 which is responsive to the duty cycle of the peaks of the low-pass filtered video detector output. The low-pass filter has a bandwidth of approximately 100KHz in contradistinction to conventional wide-band sync separator circuits which typically have bandwidths on the order of about 2MHz, thereby providing a noise figure improvement of about 20-fold.

Assuming that AFC system 20 has suitably locked onto a picture carrier, the output of video detector 18 will consist of a waveform generally similar to waveform A of FIG. 3. It will be appreciated that waveform A represents one polarity (specifically, the negative polarity) of the video signal modulating the RF and IF carrier signals processed by tuner 12 and IF section 16. In waveform A, points a and b correspond to the peaks of two adjacent horizontal synchronizing pulses whereas the lower signal levels therebetween consist of reproduceable video information. The video signal levels more closely approaching the zero-carrier reference line correspond to whiter picture elements while the signal level more closely approaching the horizontal synchronizing pulse peaks correspond to darker picture elements. The effect of low-pass filtering or integrating waveform A in low-pass filter 27 is shown by waveform B of FIG. 3. It will be noted that waveform B corresponds to a signal having relatively narrow negative-going spikes coincident with the trailing edges of the horizontal synchronizing pulses of the detected video signal. The duty cycle of these negative-going spikes at reference level c is approximately 8%. Peak duty cycle detector 26 includes circuit means for detecting the foregoing 8% duty cycle signal and for coupling a logically high level signal to the second input of AND gate 24 in response thereto.

Various possible outputs of video detector 18 for the condition where AFC system 20 has locked onto, for example, the adjacent lower channel sound carrier, see FIG. 2B, are illustrated by waveforms C and E of FIG. 3. With reference to FIG. 2B, waveform C corresponds to the condition where the amplitude of the 44.25MHz picture carrier is relatively small (e.g. at a level corresponding to point d) compared to the amplitude of the 45.75MHz adjacent sound carrier. Under these circumstances, video detector 18 heterodynes the amplified picture and adjacent sound carriers to produce a 1.5MHz beat note modulated by the video and sync signals as exemplified by waveform C. Since waveform C has an average DC value of zero, the effect of low-pass filtering or integrating the signal is to produce a zero level signal as shown by waveform D of FIG. 3. The absence from waveform D of the previously discussed 8% duty cycle negative spikes results in peak duty cycle detector 26 coupling a logically low level signal inhibiting AND gate 24 and thereby indicating that AFC system 20 is not locked to a picture carrier.

As the amplitude of the 44.25MHz picture carrier approaches the amplitude of the adjacent sound carrier (e.g. at point e in FIG. 2B), the output of video detector 18 takes the shape illustrated by waveform E of FIG. 3. Waveform E is characterized by heavy cross-modulation components resulting from the limiting action of IF section 16. In particular, as the picture carrier amplitude is increased, the envelope of the modulated 1.5MHz beat note attempts to increase proportionately and in a symmetrical manner. However, due to the limiting of IF section 16 the negative peaks of the waveform are limited from further increasing to a level such as g. On the other hand, the positive peaks of the waveform approaching zero-carrier are not so limited and increase with increasing picture carrier amplitude resulting in the production of a positive-going 15KHz modulating signal. The result of low-pass filtering highly cross-modulated waveform E is shown by waveform F of FIG. 3. It will be noted that waveform F comprises a series of positive-going spikes having peaks coincident with the portion of waveform E corresponding to the horizontal synchronizing pulses. Since these positive-going spikes are not characterized by the requisite duty cycle, peak duty cycle detector 26 develops a logically low level output in response thereto. The logically low level output is coupled to and inhibits AND gate 24 again indicating that AFC system 20 is not locked to a picture carrier.

Figure 4:
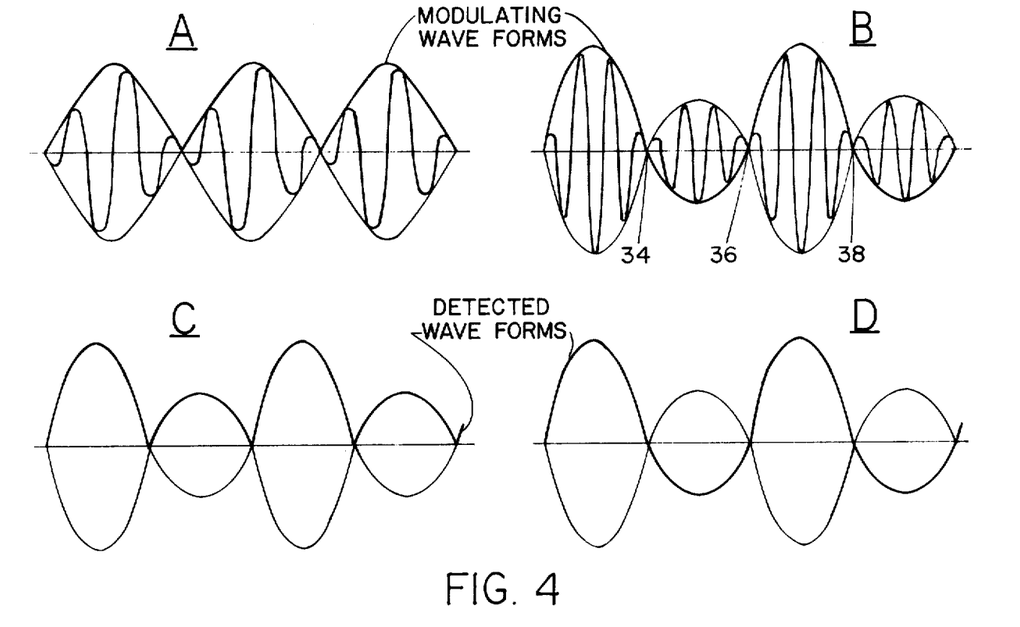
FIG. 4 illustrates the effect of demodulating a more than 100% modulated signal using a synchronous detector and using an envelope detector.

As the amplitude of the picture carrier further increases relative to the amplitude of the adjacent sound carrier (e.g. to point f in FIG. 2B), in addition to being heavily cross-modulated, the modulation characterizing waveform E will exceed 100%. The effects of over-modulating a carrier signal are illustrated in FIG. 4. Waveform A of FIG. 4 represents, for comparison purposes, a 100% modulated signal. Waveform B of FIG. 4 illustrates a carrier signal being amplitude modulated to an extent exceeding 100%. It will be particularly noted that, with respect to waveform B, a 180° phase reversal of the carrier signal occurs at the crossover points 34, 36 and 38 of the modulating signal. Demodulation of waveform B by a conventional envelope detector and by a synchronous detector is illustrated by waveforms C and D respectively of FIG. 4. With reference to detected waveform C developed by a conventional envelope detector, it will be observed that the modulating signal is not faithfully reproduced since the negative alternations of the modulating signal are reproduced in a rectified orientation in the detected waveform. On the other hand, detected waveform D, developed by a synchronous detector, faithfully reproduces the original modulating signal. It will be observed that with reference to the 100% modulated waveform A, the peak to peak amplitude of the envelope detector output (waveform C) decreases whereas the peak to peak amplitude of the synchronous detector output (waveform D) increases in magnitude. This difference in the operation of a conventional envelope detector and a synchronous detector has a drastic effect on the output of video detector 18 when the picture carrier amplitude exceeds the adjacent sound carrier amplitude to an extent attempting to drive the portions of the 1.5MHz beat note corresponding to horizontal synchronizing pulses beyond the zero-carrier level into the super-white area. Specifically, for the case where video detector 18 comprises a synchronous detector, the peaks of the 1.5MHz beat note will pass through zero-carrier and into the super-white area to a level such as at h. By contrast, in the case where video detector 18 comprises an envelope detector, the peaks of the 1.5MHz beat note will fold down after reaching zero-carrier and decrease in magnitude with increased picture carrier amplitude to a level such as at i. Of course, for both types of detectors the negative peaks of the beat note are limited to level g by IF section 16.

Waveform G represents the effect of low-pass filtering the output of a synchronous video detector in response to a signal such as waveform E where the picture carrier amplitude is sufficiently greater than the adjacent sound carrier amplitude to drive the peaks of the 1.5MHz beat note (corresponding to the horizontal sync pulses) beyond the zero-carrier level. Similarly, waveform H represents the effect of low-pass filtering the output of a conventional envelope detector in response to a similar signal. Since waveform G is characterized by a positive polarity and is substantially identical to waveform F, peak duty cycle detector 26 will couple a logically low level signal to AND gate 24 correctly recognizing the condition that AFC system 20 is not locked onto a picture carrier. However, since waveform H is substantially identical to waveform B, the use of a conventional envelope detector will result in peak duty cycle detector 26 coupling a logically high level signal to AND gate 24 indicating that AFC system 20 is locked onto a picture carrier. The foregoing inconsistency resulting from the use of a conventional envelope detector for performing the video detection function is alleviated by means of beat signal detector 32. Beat signal detector 32, during the horizontal sync timing intervals, senses the presence of the high amplitude 1.5MHz beat note characterizing waveform E when AFC system 20 is locked onto the adjacent sound carrier which has a substantially smaller amplitude than the picture carrier. Upon sensing this high amplitude beat note, beat signal detector 32 couples a logically low level signal to AND gate 24 inhibiting the gate even though peak duty cycle detector 26, in response to the output of an envelope video detector, develops a logically high level output indicating that a picture carrier has been locked onto. In this manner, a recognition signal is not developed in response to waveform H even though it is substantially identical to waveform B.

Figure 5:
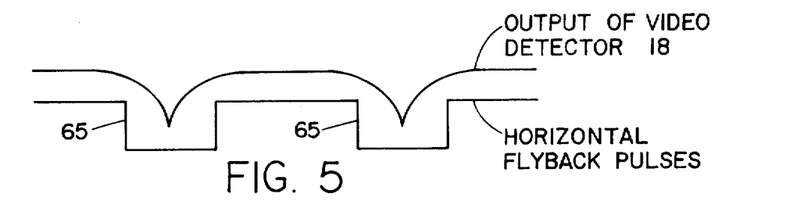
FIG. 5 illustrates a condition of correlation between two signals.

Correlator 28 contributes to signal recognition system 10 by providing a degree of noise immunity to the operation thereof. More specifically, correlator 28 develops an output signal indicative of the correlation between the low-pass filtered output of video detector 18 (e.g. waveform B of FIG. 3) and the horizontal flyback pulses developed by horizontal deflection system 30. A condition of correlation between these two signals is illustrated in FIG. 5 and results in correlator 28 developing a logically high level output enabling AND gate 24 for developing the video carrier recognition signal. Noise immunity is provided in that the conventional television sync circuits are relatively wide-band and consequently detect horizontal sync even in the presence of considerable noise. Consequently, the horizontal flyback pulses provide a relatively accurate standard against which system operation may be measured.

In particular, low-pass filter 26 is somewhat susceptible to noise for causing peak duty cycle detector 26 to detect negative-going spikes from such noise instead of in response to the horizontal synchronizing pulses. Since the noise produced spikes will generally not temporarily correspond to the horizontal synchronizing pulses, requiring correlation therebetween enables the system to distinguish between noise produced spikes developed at the output of the video detector 18 and spikes developed in response to horizontal synchronizing pulses. Thus, in response to the existence of correlation between the spikes characterizing the output of video detector 18 and the horizontal flyback pulses developed in horizontal deflection system 30, correlator 28 produces a logically high level output enabling AND gate 24 and otherwise produces a logically low level signal inhibiting the gate.

Figure 6:
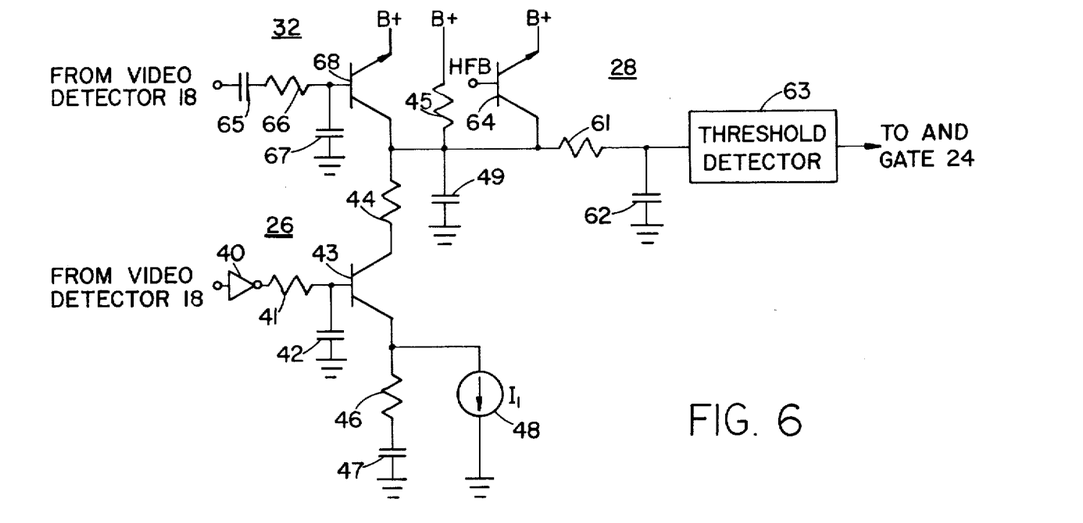
FIG. 6 is an electrical schematic diagram showing an embodiment of the duty cycle detector, the correlator and the beat signal detector illustrated generally in FIG. 1.

From the foregoing, it will be appreciated that peak duty cycle detector 26 is of key importance to the operation of signal recognition system 10. A preferred embodiment of a circuit capable of performing the function attributable to peak duty cycle detector 26 is illustrated in FIG. 6. With reference to this figure, it will be initially noted that the output of video detector 18 is inverted by an inverter 40 and coupled through low-pass filter 27 consisting of a resistor 41 and a capacitor 42 to the base electrode of a transistor 43. The base electrode of transistor 43 comprises the input of peak duty cycle detector 26, peak duty cycle detector 26 further including a pair of series connected resistors 44 and 45 coupled between the collector of transistor 43 and a source of positive DC potential. The series combination of a resistor 46 and a capacitor 47 is coupled between the transistor's emitter electrode and a point of reference potential. A current source 48, operative for supplying a constant level of current $I_1$, is connected in parallel across the series combination of resistor 46 and capacitor 47. Finally, the output of peak duty cycle detector 26 is developed across a capacitor 49 connected to the junction formed between resistors 44 and 45.

Peak duty cycle detector 26, as illustrated in FIG. 6, is operative essentially for converting the duty cycle characterizing the peaks of an input signal to the amplitude or height of the signal developed at the circuit's output. In other words, the amplitude of the output signal is a direct measure of the duty cycle of the peaks of an input signal, the peaks of the input signal being defined as those portions of the input signal extending above a voltage level determined in part by the value $I_1$ of current source 48. More specifically, and with reference to FIG. 7, the solid line waveform 53 represents a typical input signal coupled from video detector 18 through low-pass filter 27 to the base of transistor 43. It will be observed that waveform 53 comprises an inverted representation of waveform B of FIG. 3. In response to the input signal represented by waveform 53, transistor 43 is initially caused to conduct whereby charging current $I_c$ flows through the transistor charging capacitor 47 as represented by segment A of waveform 54. Transistor 43 eventually ceases conducting at a point slightly subsequent of the peak amplitude of waveform 53 in response to the voltage developed at its emitter by capacitor 47. During the immediately following non-conducting state of transistor 43, capacitor 47 discharges at a constant rate determined by current $I_1$ as represented by segment B of waveform 54. When the amplitude of the input signal again increases to a level sufficient to turn on transistor 43, capacitor 47 is again charged by charging current $I_c$ as represented by segment C of waveform 54. Subsequently, transistor 43 again ceases conducting whereby capacitor 47 is again discharged through current source 48 as shown by segment D of waveform 54. Capacitor 47 is thereafter alternately charged and discharged in a manner identical to that producing segments C and D.

It will be noted that, with reference to waveform 54, the charging cycles of capacitor 47, e.g. segment C, temporarily define a plurality of intervals during which the peaks of the input signal exceed a particular level. For any given input signal, this level is primarily dependent upon the value $I_1$ of current source 48. For instance, if the value of current source 48 is decreased from the previous example, capacitor 47 will discharge at a decreased rate effectively decreasing the conduction time of transistor 43 and thereby defining a smaller peak duty cycle. Similarly, if the value of current source 48 is increased, capacitor 47 will discharge at an increased rate such that charging segment C corresponds to a broader portion of the peaks of the input signal.

Figure 7:
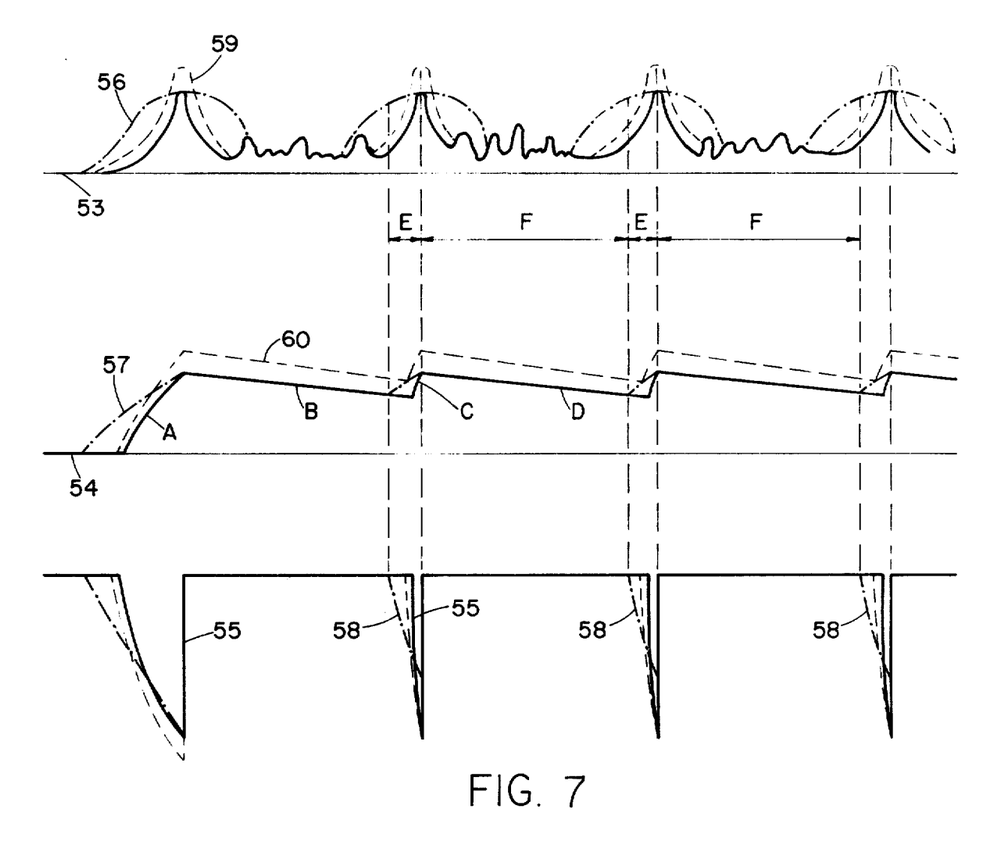
FIG. 7 depicts various waveforms pertinent to the operation of the peak duty cycle detector shown in FIG. 6.

The solid line waveform 55 of FIG. 7 represents the output of peak duty cycle detector 26 developed across capacitor 49 in response to input signal waveform 53. It will be observed that output waveform 55 comprises a series of negative-going pulses occurring during the charging periods of capacitor 47 when transistor 43 is conducting. The amplitude of the pulses is determined by the value of resistors 44 and 45 and charging current $I_c$. Analysis of the circuit will reveal that the charging current $I_c$ is related to the duty cycle of the peaks of the input signal through the following expression; $I_c = I_1/$peak duty cycle. In other words, expressing the peak duty cycle of the input signal as $\Delta t_2/\Delta t_1$, where $\Delta t_2$ corresponds to the conduction state of transistor 43 and $\Delta t_1$ to the transistor's non-conducting state, the charging current $I_c = (\Delta t_1/\Delta t_2)I_1$. The foregoing expression mathematically states that, in order to maintain system equilibrium, the charge supplied to capacitor 47 during charging periods must be removed therefrom during discharging periods; i.e. $I_1\Delta t_1 = I_c\Delta t_2$. With this in mind, observe the effect of increasing the duty cycle of the input signal as represented by alternately dotted and dashed waveform 56 of FIG. 7. As illustrated by waveform 57, the charging periods E during which transistor 43 is conducting are increased relative to segments C while the discharging periods F are decreased. Consequently, charging current $I_c$ decreases and the output pulses represented by waveform 58 are of decreased amplitude and of increased width relative to the pulses comprising waveform 55. Thus, it will be observed that the amplitude of the output pulses decrease as the peak duty cycle of the input signal increases. As a result, the amplitude of the output pulses is a direct measure of the peak duty cycle of the input signal.

Furthermore, it is important to note that the output pulsating waveform developed across capacitor 49 is independent of input signal strength for normal signal variations. Particularly under conditions where tuner 12 is not locked to a picture subcarrier, the AGC system of the receiver may incorrectly set the level of the signal supplied to video detector 18. Therefore, the level of the input signal supplied to peak duty cycle detector 26 is not altogether predictable rendering it highly desirable that detector 26 operate substantially independently of this signal level. For purposes of illustration, dotted line waveform 59 represents an input signal having an increased level relative to the input signal represented by waveform 53. Waveform 60 represents the voltage developed across capacitor 47 in response to the input signal represented by waveform 59. It will be observed that waveform 60 is substantially identical to waveform 54 except that its level has been shifted upwardly and that the conducting state of transistor 43 has been slightly increased. However, since the ratio of $\Delta t_2$ to $\Delta t_1$ remains substantially the same as in the case of waveform 53, the amplitude of the output pulses, as well as their width, remains nearly unchanged except for the initial pulse. Thus, the peak duty cycle determining amplitude of the output pulses is developed substantially independent of the level of the input signal.

The output pulses developed by peak duty cycle detector 26 across capacitor 49 are coupled through a low-pass filter consisting of a resistor 61 and a capacitor 62 to the input of a threshold detector 63. Threshold detector 63 may comprise any of a number of well-known circuits and is operative for developing an output control signal in response to the negative peak amplitude of the output pulses developed across capacitor 49 by peak duty cycle detector 26 exceeding a predetermined threshold level. Thus, a control output from threshold detector 63 indicates that the peak duty cycle of the low-pass filtered signal coupled to the base of transistor 43 is characterized by a value less than a selected reference value, the selected reference value corresponding directly to the predetermined threshold level defining the operation of threshold detector 63. The control output of threshold detector 63 is, of course, coupled to an input of AND gate 24.

Correlator 28 is shown in FIG. 6 as consisting of a transistor 64 having an emitter electrode coupled to a source of positive DC potential and a collector electrode connected to the junction between resistors 44 and 45. Horizontal flyback pulses developed by horizontal deflection system 30 are coupled to the base electrode of the transistor. Referring back to FIG. 5, it will be observed that during the negative peaks 65 of the horizontal flyback pulses transistor 64 is cut-off while the transistor conducts during the video information containing intervals located therebetween. As a result, transistor 64 has no effect on the output pulses developed across capacitor 49 during the occurrence of a horizontal flyback pulse but, during the intervening time intervals, causes the voltage across capacitor 49 to rise to B+. Since, under proper operating conditions, the output pulses developed across capacitor 49 by peak duty cycle detector 26 are in correlation with the horizontal flyback pulses, the output pulses will not be affected by transistor 64 which is cut-off during their occurrence. The output pulses are therefore coupled to threshold detector 63 for processing as previously described. During the intervening time intervals, corresponding to the occurrence of video information, the B+ voltage level coupled to threshold detector 63 through conducting transistor 64 does not affect system operation in that a control output from detector 63 is not, in any event, desired during these intervals. However, should the relative phase of the horizontal flyback pulses and the output pulses developed by peak duty cycle detector 26 change so as to destroy correlation there between, threshold detector 63 is effectively inhibited from developing a control output. This is due to the fact that the voltage across output capacitor 49 is maintained at B+ by transistor 64 during the occurrence of the negative-going output pulses developed by peak duty cycle detector 26. Moreover, it will be appreciated that the output developed by peak duty cycle detector 26 intermediate the negative-going pulses is of insufficient amplitude to cause threshold detector 63 to develop an output control signal when transistor 64 is cutoff during the occurrence of horizontal flyback pulses. Thus, transistor 64 serves to enable threshold detector 63 for sampling the negative-going pulses developed by peak duty cycle detector 26 in response to the existence of correlation between the negative-going pulses and the horizontal flyback pulses and to otherwise inhibit detector 63. Inhibiting threshold detector 63 corresponds to coupling a zero level signal from correlator 28 to AND gate 24 indicative of a non-recognition condition.

Beat signal detector 32 as shown in FIG. 6 is embodied in a band-pass filter, consisting of a capacitor 65, a resistor 66 and a capacitor 67, and a transistor 68 responsive thereto. Capacitors 65 and 67 and resistor 66 are selected for establishing a band-pass characteristic of about 2 MHz centered at 1.5 MHz for coupling a 1.5 MHz beat note from video detector 18 to the base electrode of transistor 68. The emitter of transistor 68 is connected to a supply of positive DC potential while its collector is connected to the junction between resistors 44 and 45 and across capacitor 49.

It will initially be observed that in the absence of a relatively high amplitude 1.5 MHz beat note at the output of video detector 18, transistor 68 is non-conductive and thereby does not affect the operation of the remainder of the system. That is, in the absence of a 1.5 MHz beat note at the output of video detector 18, peak duty cycle detector 26 and correlator 28 function exactly as previously described. However, the existence of a sufficiently high amplitude 1.5 MHz beat note at the output of video detector 18 is coupled through the band-pass filter consisting of capacitors 65 and 67 and resistor 66 to the base of transistor 68 causing the transistor to become conductive during the positive alternations of the beat note. Consequently, transistor 68 is alternately conductive and non-conductive at about a 1.5 MHz rate wherein the negative-going pulses developed by peak duty cycle detector 26 and developed across capacitor 49 are chopped at a like rate. The chopped negative-going pulses are subsequently integrated by resistor 61 and capacitor 62 whereby their amplitude is decreased to a point insufficient to cause threshold detector 63 to develop a control output for application to AND gate 24. The operation of beat signal detector 32 is therefore effective for inhibiting AND gate 24 in response to a relatively high amplitude 1.5 MHz beat note at the output of video detector 18. It will further be recognized that beat signal detector 32, in response to a relatively high amplitude 1.5 MHz beat note, has no effect on the output of threshold detector 63 during the intervals of the output of peak duty cycle detector 26 intermediate the negative-going pulses. During these intervals the output of peak duty cycle detector 26 is characterized by a signal having a B+ voltage, which signal is unaffected by the switching action of transistor 68.

With further reference to beat signal detector 32, it may be desirable to include a full-wave rectifier intermediate the base of transistor 68 and resistor 66. Such a full-wave rectifier would cause transistor 68 to conduct continuously in response to a high amplitude 1.5 MHz beat note pulling the voltage across capacitor 49 to B+. As previously described, this would result in inhibiting threshold detector 63 from developing a control output for application to AND gate 24.

Lock detector 22, responsive for developing a logically high level output when AFC system 20 has locked onto a subcarrier signal, may comprise a number of different circuits depending upon the particular AFC system used in the receiver. For example, the signal seeking tuning system disclosed in previously mentioned U.S. Pat. No. 4,041,535 to Rzeszewski et al uses a pair of comparators to establish a window about the zero crossover point in the AFC's discriminator curve. An output voltage from the AFC system within the window along with an indication that the receiver is actually receiving a transmitted signal represents the condition that the AFC system is locked onto a subcarrier signal and, in the system of FIG. 1, would result in lock detector 22 developing a logically high level output signal for enabling AND gate 24.

Figure 8:
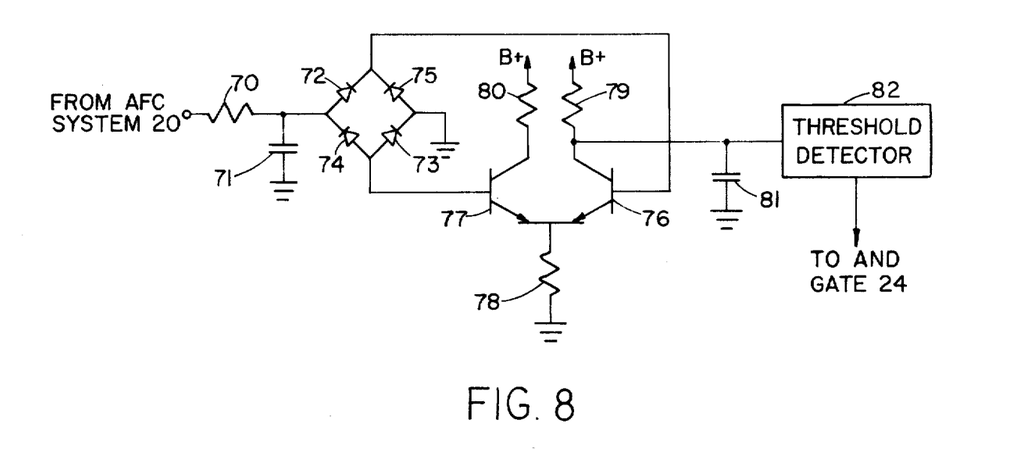
FIG. 8 is an electrical schematic diagram illustrating an embodiment of a lock detector suitable for use with a frequency and phase lock loop AFC system.

U.S. patent application Ser. No. 739,672, filed Nov. 8, 1976 now U.S. Pat. No. 4,091,410, issued May 23, 1978 and assigned to the assignee of the present invention, discloses an AFC system utilizing a frequency and phase locked loop, see in particular FIG. 2 of the application, which is believed to offer numerous advantages over prior art AFC systems. This AFC system is particularly characterized in the development of a ±1 logical level signal in response to a locked state and a 0 level signal in response to an unlocked state. A lock detector suitable for use in association with an AFC system exhibiting the foregoing characteristics is illustrated in FIG. 8. The logical signals developed at the output of the AFC system (+1, −1 or 0) are coupled by a low-pass filter consisting of a resistor 70 and a capacitor 71 to a full-wave rectifier comprising diodes 72, 73, 74 and 75. The junction formed between the cathodes of diodes 72 and 75 supplies the base of a first transistor 76 while the junction formed between the anodes of diodes 73 and 74 supplies the base of a second transistor 77. The emitters of transistors 76 and 77 are connected in common to ground by a resistor 78, the transistor collectors being connected to B+ potential through resistors 79 and 80 respectively. Finally, the collector of transistor 79 is coupled by a capacitor 81 to the input of a threshold detector 82 whose output in turn supplies AND gate 24.

The circuit illustrated in FIG. 8 operates as follows. Initially, as between transistors 76 and 77, the transistor exhibiting the higher base voltage is caused to conduct heavily while the remaining transistor is cut-off. If the base voltages are equal, both transistors 76 and 77 conduct but at a reduced rate. Since the base of transistor 76 is at a higher voltage than the base of transistor 77 in response to the development of either a +1 or −1 level signal by AFC system 20 (representing that a subcarrier signal has been locked onto), transistor 76 is highly conductive under either of these conditions. Consequently, a relatively low level signal is coupled by capacitor 81 to the input of threshold detector 82 which detects the low level signal and in turn, develops a logically high level output signal for enabling AND gate 24. However, in response to the generation of a 0 level output by AFC system 20, both transistors 76 and 77 conduct equally resulting in the development of a high level voltage at the collector of transistor 76. This high level signal is above the threshold established by threshold detector 82 which, therefore, develops a logically low level output inhibiting AND gate 24 in response to the unlocked condition of AFC system 20.

What has thus been shown is an improved video carrier recognition system which may be categorized as a "smart" system in view of its ability to properly respond under conditions likely to fool prior art devices. In particular, the system interrogates the output of a television receiver's video detector and AFC system for recognizing certain conditions indicating that the receiver is suitably tuned to a video carrier signal. These conditions include—AFC system lock, the presence of a relatively low peak duty cycle characterizing the low-pass filtered output of the video detector and the absence of a relatively large amplitude 1.5 MHz beat note at the output of the video detector. In addition, noise immunity may be provided by requiring correlation between the low-pass filtered output of the video detector and the horizontal flyback pulses developed in the receiver's horizontal deflection system.

While particular environments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. For example, it will be readily recognized that transistors 64 and 68 can be decoupled from threshold detector 63 and used to independently drive inputs of AND gate 24. Moreover, AND gate 24 could be replaced with a microprocessor which, in addition to requiring coincidence of the input signals, could sequentially examine the signals on a priority basis.

What is claimed is:

1. In a television receiver having a tuner responsive to a received RF television signal for developing video and audio IF subcarrier signals, an AFC system for locking one of said IF subcarrier signals to the video IF frequency of said receiver and a video detector for detecting said video IF subcarrier signals; the improved circuit for producing a recognition signal in response to said video subcarrier being locked to said video IF frequency comprising:

first detector means coupled to said AFC system for developing a first control signal in response to said AFC system being locked to an IF subcarrier signal;

filter means connected for low-pass filtering the output of said video detector;

second detector means coupled to said filter means for developing a second control signal in response to said low-pass filtered output of said video detector comprising a plurality of signal spikes whose peaks are characterized by a duty cycle having a value less than a predetermined value, said spikes having a predetermined polarity and corresponding to the horizontal synchronizing pulses of said television signal; and coincidence gate means coupled to said first and second detectors and responsive only to the presence of said first and second control signals for producing said recognition signal.

2. The improved signal recognition circuit according to claim 1 wherein said television receiver includes a horizontal deflection system for developing horizontal flyback pulses and including third detector means coupled to said horizontal deflection system and to said second detector means for developing a third control signal in response to the existence of a predetermined relationship between said spikes and said horizontal flyback pulses, said coincidence gate means also being coupled to said third detector means and responsive only to the presence of said first, second and third control signals for producing said recognition signal.

3. The improved signal recognition circuit according to claim 2 wherein said predetermined relationship comprises the existence of correlation between said spikes and said horizontal flyback pulses for a predetermined number of horizontal scanning lines.

4. The improved signal recognition circuit according to claim 1 wherein said video detector comprises an envelope detector and including fourth detector means responsive to the output of said envelope detector for developing a fourth control signal in response to the absence of a relatively high amplitude 1.5 MHz beat note, said gate means being coupled to said fourth detector and responsive only to the presence of said first, second, and fourth control signals for producing said recognition signal.

5. The improved signal recognition circuit according to claim 4 wherein said fourth detector means is coupled to the output of said second detector means and operative in response to said low-pass filtered output only during time intervals substantially corresponding to the presence of said spikes.

6. The improved signal recognition circuit according to claim 1 wherein said second detector means comprises means for converting, in an inverse relationship, the duty cycle characterizing the peaks of said spikes to the amplitude of an output signal and a threshold detector for developing said second control signal in response to the amplitude of said output signal exceeding a predetermined level.

7. The improved signal recognition circuit according to claim 6 wherein said means for converting is operative substantially independently of the signal level of said low-pass filtered output of said video detector.

8. The improved signal recognition circuit according to claim 6 wherein said peaks are defined by a signal level slightly less than the peak amplitude of said low-pass filtered output of said video detector and wherein said means for converting includes means for adjusting said signal level defining said peaks relative to said peak amplitude of said low-pass filtered output of said video detector.

9. The improved signal recognition circuit according to claim 6 wherein said means for converting comprises a source of DC potential and a point of reference potential, a transistor having a collector electrode resistively coupled to said source of DC potential, a base electrode connected for receiving said low-pass filtered output of said video detector and an emitter electrode coupled to said reference potential by the parallel combination of a capacitive network and a constant current source, said output signal being developed between said collector electrode and said reference potential.

* * * * *